July 26, 1927.
A. BURCH ET AL
1,636,679
FRUIT PICKING PAIL COVER
Filed Sept. 8, 1925
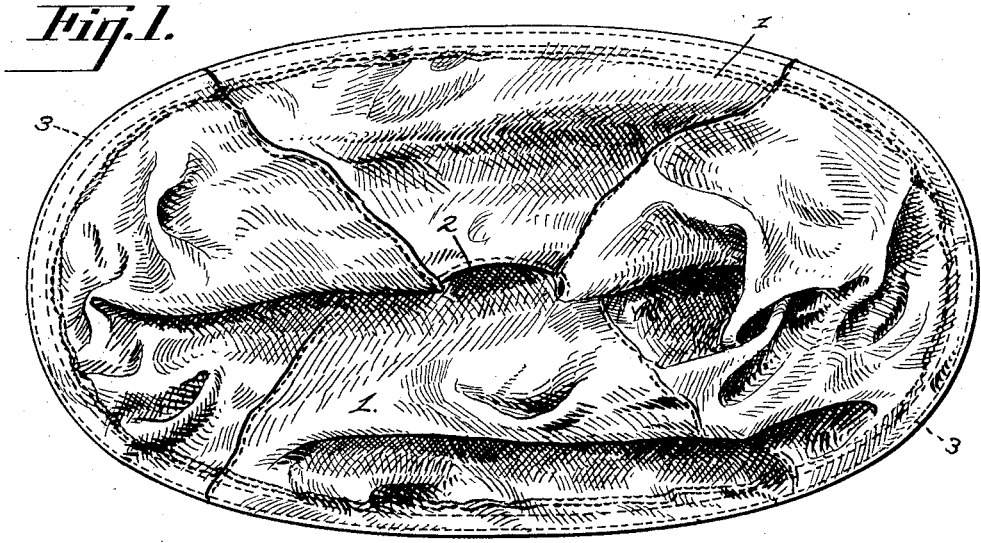
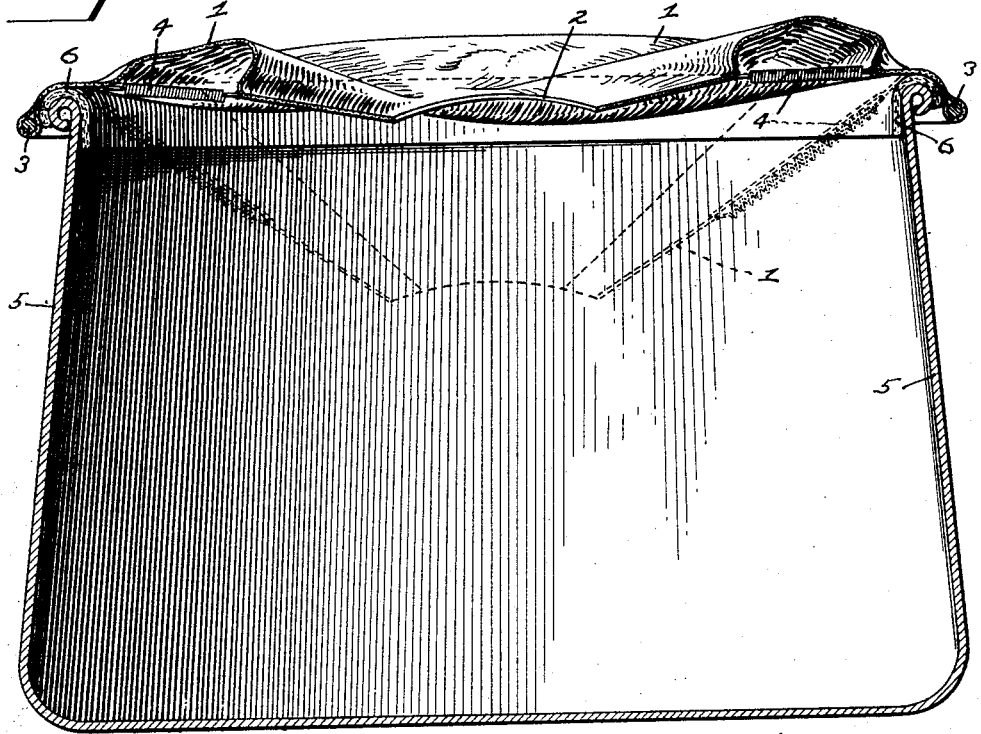
INVENTORS
ALBERT BURCH
RAY C. YOST
BY Arthur L. Slee
ATTY.

Patented July 26, 1927.

1,636,679

UNITED STATES PATENT OFFICE.

ALBERT BURCH AND RAY C. YOST, OF MEDFORD, OREGON.

FRUIT-PICKING-PAIL COVER.

Application filed September 8, 1925. Serial No. 55,034.

Our invention relates to improvements in covers for fruit picking pails and the like wherein a yieldable web is stretched across the top of a pail to receive fruit and check the fall thereof and to deliver said fruit into the pail.

The primary object of our invention is to provide an improved cover for fruit picking pails.

Another object is to provide a cover which will effectively check the fall of fruit and deliver said fruit into a pail with the least possible bruising or injury to the fruit.

A further object is to provide a cover which will check the fall of fruit and deliver said fruit into a pail without materially reducing the capacity of said pail.

Another object is to provide an improved cover of the character described which may be easily applied and removed from the top of a pail and which will protect fruit from injury against the top edge of the pail.

A still further object is to provide an improved cover which may be economically manufactured.

We accomplish these and other objects by means of the improved device in the drawings forming a part of the present specification wherein like characters of reference are used to designate similar parts throughout said specifications and drawings and in which, Fig. 1 is a plan view of our improved cover.

Fig. 2 is a longitudinal vertical section of a picking pail provided with our improved cover, the cover being shown in section in full lines in normal position and in dotted lines in the fruit delivering position.

Referring to the drawings our improved cover will be seen to consist of a web 1 of canvas or other suitable material having a centrally disposed opening 2 and having the outer edges secured around a frame 3 formed from relatively rigid wire or other suitable material.

The web is preferably formed from a plurality of segments stitched together along their edges to form a cover adapted to be extended in cone shape from the frame to the opening 2.

Springs 4, or other suitable elastic elements, are secured upon the under side of the web to normally stretch the web across the frame whereby the web will normally be held substantially in the plane of the frame, the web being drawn into loose folds as shown in the drawings. The springs 4, are adapted to be extended to permit the web to be extended into cone shape as above described.

The frame 3, is made of a size and shape arranged to fit around the top of a fruit picking pail 5, to which it is to be applied. In the drawings we have illustrated a pail of a type largely used by fruit pickers wherein the top of the pail is made substantially elliptical in shape and the sides made to flare slightly outwardly from the top of the pail to avoid or reduce the impact of the fruit against the sides of the pail. In the form illustrated, the frame 3, is made of a corresponding elliptical shape and of a size arranged to fit closely over the top of the pail, said frame being formed from heavy wire affording sufficient resilience to permit the frame to be pressed over the top of the pail and there held in operative position as shown in Fig. 2 of the drawings. A pad 6 formed from felt or other suitable material is secured upon the under side of the cover adjacent the frame so that when the frame is applied to the top of a pail 5 the pad 6 will extend over the top edge of the pail, thereby cushioning said edge and preventing the bruising of fruit thereon.

In operation the cover is applied upon the top of a pail as shown and described, the web being held in normal position stretched across the top of the pail. As fruit is picked each piece of fruit is dropped into the cover which operates to check its fall. The weight and the downward movement of the fruit causes the center of the web to be displaced downwardly into the pail, the springs 4 being extended and the web moved against the tension of said springs into the inverted cone shape shown in dotted lines in Fig. 2 of the drawings. When the web is thus displaced the fruit moves downwardly and is delivered through the opening 2 into the bottom of the bucket. As soon as the fruit has passed through the opening 2 the web is immediately drawn back to normal position by the action of the springs 4.

By normally holding the web stretched across the top of the pail as above described, the web operates to effectively check the fall of fruit and to deliver such fruit lightly into the pail, thus greatly reducing the injury to fruit caused by impact against the bottom or sides of a pail or against fruit previously placed in such pail. At the same time our improved cover, being held substantially in the plane of the top of the pail, prevents the effective capacity of the pail from being reduced. Thus the fruit may be easily packed into the space immediately under the cover adjacent the sides of the pail thereby permitting the bucket to be entirely filled without impairing the efficiency of the cover in checking the fall of fruit after the pail has been filled to a point above the level of the lower edge of the web when in downwardly extended position.

As above explained the frame 3 permits the cover to be readily applied or removed from a pail, thus facilitating the emptying of a pail, or permitting a single cover to be applied successively to a plurality of pails. The pad 6 automatically covers the upper edge of the pail when the cover is applied so as to protect the fruit from injury against said edge.

While we have illustrated and described only one form of the device, it is obvious that the device may be modified in numerous ways both as to structure and as to shape so as to meet the requirements necessary for different kinds of fruits and to meet the usages of various communities. We therefore do not wish to restrict ourselves to the specific form and construction illustrated but desire to avail ourselves of all modifications which may fall within the scope of the appended claims.

Having thus described our invention what we claim as new and desire to secure by Letters Patent is,

1. A cover for fruit picking pails comprising a web adapted to be detachably mounted across the top of a pail to check the fall of fruit, said web having a centrally disposed aperture arranged to admit said fruit into the pail; and elastic means secured upon the web to normally hold the web substantially in the plane of the top of the pail and adapted to be extended to permit said web to extend downwardly into the pail in inverted cone shape to deliver the fruit into the pail.

2. A cover for fruit picking pails comprising a web adapted to be detachably mounted across the top of a pail to check the fall of fruit, said web having a centrally disposed aperture arranged to admit said fruit into the pail; and springs secured upon the under side of the web to normally hold the web substantially in the plane of the top of the pail and adapted to be extended to permit said web to extend downwardly into the pail in inverted cone shape to deliver fruit into the pail.

3. A cover for fruit picking pails comprising a frame shaped to fit around the top of a pail; a web having a centrally disposed aperture and having its outer edge secured to the frame, and springs secured upon the side of the web to normally hold the web substantially in the plane of the top of the pail and adapted to be extended to permit said web to extend downwardly into the pail in inverted cone shape to deliver fruit into the pail through the opening formed in the web.

4. A cover for fruit picking pails comprising a yieldable web adapted to be detachably mounted across the top of a pail to check the fall of fruit, said web being normally stretched and held substantially in the plane of the top of the pail and adapted to be extended to permit said web to extend downwardly into the pail in inverted cone shape to deliver fruit into the pail; and a pad secured upon the under side of the cover to extend around the top edge of the pail to prevent the bruising of fruit thereon.

5. A cover for fruit picking pails comprising a frame shaped to fit around the top of a pail; a web having a centrally disposed aperture and having its outer edge secured to the frame; elastic means secured upon the under side of the web to normally hold the web substantially in the plane of the top of the pail and adapted to be extended to permit said web to extend downwardly into the pail in inverted cone shape to deliver fruit into the pail through the opening formed in the web; and a pad secured to the under side of the web adjacent the frame to engage and cover the top edge of the pail to prevent the bruising of fruit thereon.

In witness whereof we hereunto set our signatures.

Medford, Oregon, August 18th, 1925.

ALBERT BURCH.
RAY C. YOST.